United States Patent [19]

Vargo

[11] Patent Number: 5,704,571
[45] Date of Patent: Jan. 6, 1998

[54] CABLE TRAY AND METHOD OF INSTALLATION

[76] Inventor: James M. Vargo, 9754 SW. Alsea Dr., Tualatin, Oreg. 97062

[21] Appl. No.: 307,304

[22] Filed: Sep. 16, 1994

[51] Int. Cl.$^6$ ............................................. F16L 3/00
[52] U.S. Cl. ................................... 248/58; 248/68.1
[58] Field of Search ......................... 248/49, 68.1, 58, 248/222.2, 231.3, 316; 174/68.1, 68.3, 97, 101

[56] References Cited

U.S. PATENT DOCUMENTS

| | | | |
|---|---|---|---|
| 3,243,754 | 3/1966 | Miller | 174/101 |
| 3,363,048 | 1/1968 | Vaughn | 174/72 |
| 3,618,882 | 11/1971 | Podedworny | 248/68 R |
| 3,851,378 | 12/1974 | Dessert | 29/523 |
| 5,100,086 | 3/1992 | Rinderer | 248/49 |
| 5,123,618 | 6/1992 | Guterman et al. | 248/49 |
| 5,271,586 | 12/1993 | Schmidt | 248/58 |
| 5,323,988 | 6/1994 | Handler | 248/58 |
| 5,372,341 | 12/1994 | Witherbee et al. | 248/49 |

Primary Examiner—Ramon O. Ramirez
Assistant Examiner—Gwendolyn W. Baxter
Attorney, Agent, or Firm—Klarquist Sparkman Campbell Leigh & Whinston, LLP

[57] ABSTRACT

A cable tray that can be easily assembled at a construction location and which provides a configuration that can be modified to adapt to various on-site requirements. A preferred configuration of the cable tray disclosed herein includes a commercially standard strut suspended from an overhead surface and having a U-shaped rung fastened to the strut. The system provides a fastening system that can be installed using conventional, readily available, high-speed driver systems. The cable tray of the present invention may be mounted so as to depend from horizontal surfaces or may be directly bolted to a vertical surface. Further, the cable tray may be adapted to provided a two-tier cable tray even after installation of the primary cable tray. Various fastening systems are disclosed which attach the rung to the strut. The system is primarily designed to be highly modular so that installers can adapt individual components to particular vagrancies of a building under construction during installation of the cable tray.

40 Claims, 3 Drawing Sheets

5,704,571

CABLE TRAY AND METHOD OF INSTALLATION

BACKGROUND OF THE INVENTION

1. Field of the Invention

This invention pertains to the field of cable trays that are used to support bundles of electrical cables predominantly in industrial and commercial buildings.

2. Description of the Related Art

In Vaughn, U.S. Pat. No. 3,363,048, there is disclosed a cable tray having a central spine and a plurality of brackets, or fingers (as referred to in Vaughn). Vaughn discloses a cable tray in which the brackets are braised, welded or fastened to the central spine by peening a portion of the spine to cause a binding engagement with the brackets. Although not specifically disclosed in the patent, it is known in the industry that the cable trays of Vaughn are custom fabricated in a factory for a particular layout in a building and shipped to the building site with the brackets connected to the spine.

Other cable tray systems are represented in Podedworny, U.S. Pat. No. 3,618,882, and Dessert, U.S. Pat. No. 3,851,378, which respectively disclose a cable tray and a method of constructing a cable tray. Both patents disclose a cable tray having spaced-apart parallel rails with rungs spanning a distance between the rails. In each case, as with Vaughn, the cable trays are custom fabricated at a manufacturer's facility and shipped to the construction site of the building in sections. Installation of the cable tray system then proceeds by attaching the sections to the building and to each other. When the installation calls for a vertical or horizontal change in direction, or a "T" junction, those sections must be prefabricated at the manufacturer's facility. As often happens, the installation does not proceed directly according to plan, and the cable tray must be modified on site. Modification is complicated by the prefabricated pieces, which may pose obstacles to on-site modification.

Guterman et al., U.S. Pat. No. 5,123,618, discloses a complex cable tray, including a T-shaped spine that can be suspended from a ceiling and which provides holes for receiving rungs, which are secured to the spine by bolts. The spine is preferably an extrusion and requires secondary manufacturing operations to provide the holes for receiving the rungs. And, because the rungs are preferably U-shaped in cross-section, the holes for receiving the rungs must be either square or U-shaped, both of which are more expensive to provide than are round holes. Additionally, the rungs are provided with a center column that runs along the length of the rung for attaching the rung to the spine with the bolt. Such a column adds to the expense and difficulty of manufacturing. Also, in order to attach the cable tray of Guterman et al. to a vertical wall, it is necessary to use an additional bracket. Guterman does not disclose how its cable tray can be adapted for changes of direction along a vertical or a horizontal plane, nor how it can be adapted for "T"-type intersections wherein bundles of cable split off from a main trunk.

SUMMARY OF THE INVENTION

The present invention overcomes the above-noted deficiencies by providing a cable tray that need not be prefabricated in that it can be easily installed and assembled at the building site in various sizes and configurations to meet the needs of a particular job, and which can be modified on-site to provide a plurality of alternative configurations to provide the greatest degree of flexibility and adaptability. In its elementary form, the preferred embodiment of the cable tray of the present invention comprises a standard commercially-available channel or strut having a generally U-shaped cross section and a plurality of holes located longitudinally along its bight web. The struts are suspended from a ceiling or overhead surface by threaded rods, and may be interconnected end-to-end or at angular junctions by commercially available connectors. Alternatively, abutting struts may remain disconnected. Thereafter, a series of spaced-apart rungs are attached to the strut by means of fasteners. Preferably, the rungs are U-shaped and mounted to the struts such that their distal arms are oriented upward, thereby providing a structure capable of holding and retaining a plurality of cables.

The cable tray of the present invention is highly adaptable so that it may be customized on-site for a variety of installation applications. For example, a strut may be located on a vertical surface, and an arm of each rung may be attached to the strut. Additionally, the struts may be stacked and combined with different sized rungs to provide double, vertically displaced cable trays. Furthermore, as provided in the basic embodiment, the rungs are located symmetrically about the strut. However, if required for a particular installation, some or all rungs may be mounted asymmetrically on the strut, or one part of each rung may be cut so that only one-half of the rung remains attached to the strut. In the latter case, cables would be prevented from falling off the cut sides of the rungs by the descending threaded rods which suspend the strut.

The preferred fastener comprises a bolt and custom nut wherein the nut is adapted to be received within the channel opening of the strut and catch on opposing rolled edges of the strut sidewalls. Alternative embodiments include specialized configurations of the rungs to facilitate their attachment to the strut. In one such alternative, a centrally located portion of the rung is formed into a deep, narrow U-shaped curved portion which descends into the channel opening of the strut and through a hole in the bight web where it is connected to the strut by a cam-shaped pin.

Various advantages and features of novelty which characterize the invention are particularized in the claims which follow. However, for a better understanding of the invention and its advantages, reference should be had to the drawings which form a part hereof and the accompanying descriptive matter in which there is illustrated and described preferred embodiments of the invention.

DETAILED DESCRIPTION OF THE PREFERRED EMBODIMENTS

Figure 1:
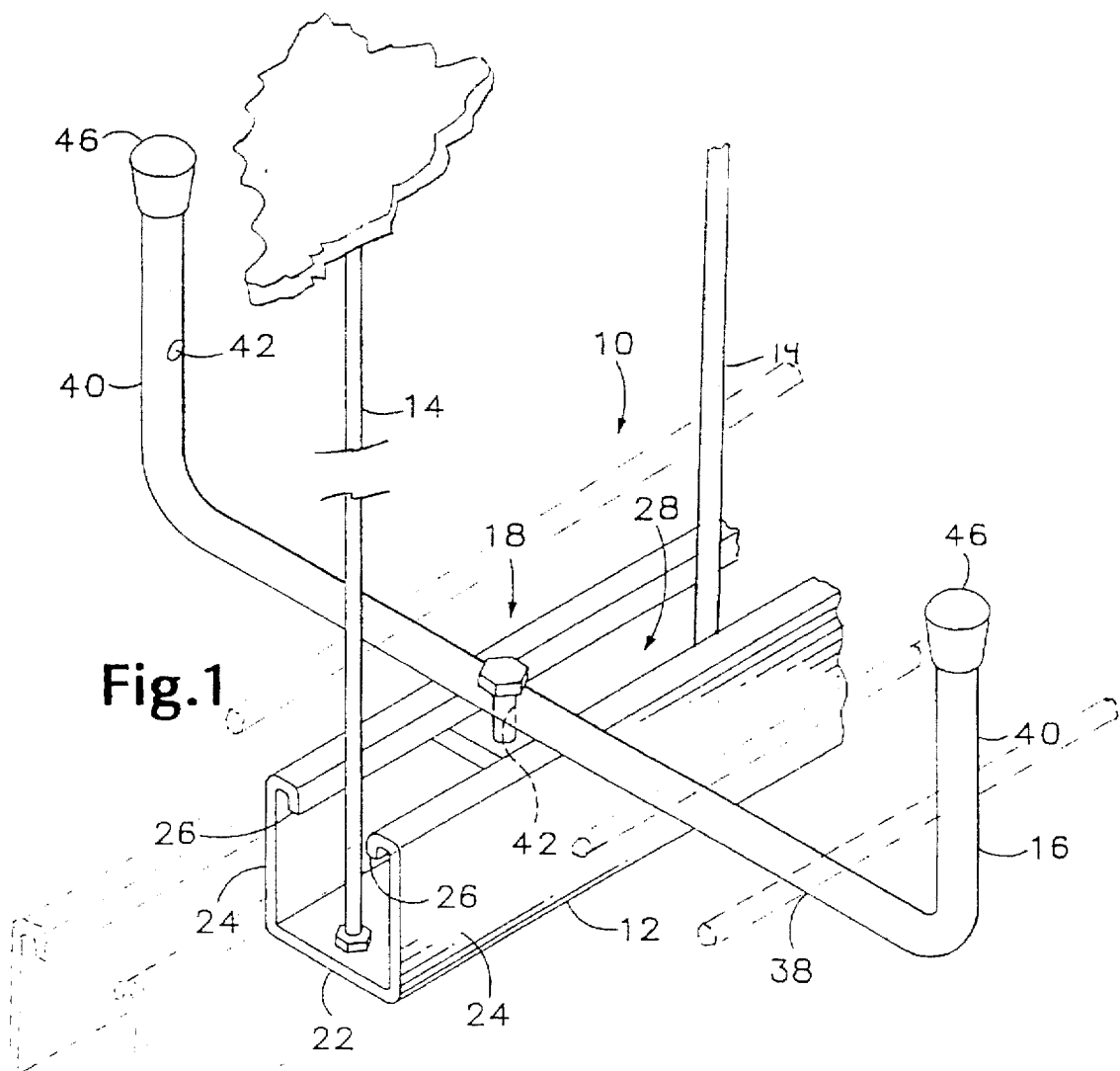
FIG. 1 is a perspective view of a preferred embodiment of a cable tray of the present invention.
Figure 2:
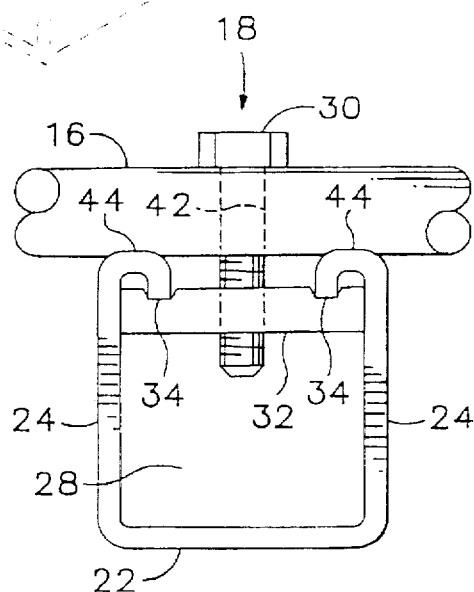
FIG. 2 is an end view of the cable tray of FIG. 1.

With reference to FIGS. 1 and 2, there is shown a preferred embodiment of a cable tray 10 of the present invention. The cable tray 10 includes a strut 12 that is suspended by a threaded rod 14, which is in turn connected to a ceiling (not shown) or other overhead surface. A rung 16 is attached to the strut 12 by a fastener 18.

The strut is commercially available, standardized, U-shaped channel-stock having a bight web 22 connecting two sides 24 having rolled edges 26. The web 22 and sides 24 define an elongate channel or recess 28. The web 22 also defines a plurality of longitudinally arranged holes (not shown), exemplarily shown as receiving threaded rod 14 in FIG. 1. One standard commercially-available strut is made and sold by UNISTRUT Corporation of Wayne, Mich., as part number P1000HS.

Figure 2A:
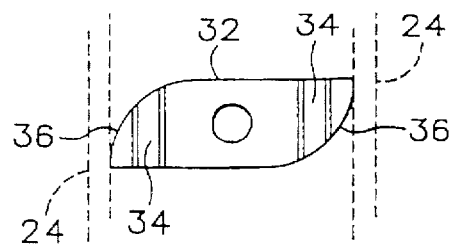
FIG. 2a is a detail plan view of a preferred embodiment of a nut plate that is a part of a mechanical fastener of the present invention.

The fastener 18 includes a bolt 30 and a nut plate 32 adapted to threadingly receive the bolt. The nut plate is provided with valleys 34 that can receive portions of the rolled edges 26. Also, as shown in FIG. 2a, the nut plate 32 may be provided with curved, beveled ends 36. When thusly configurated, the nut plate 32 can be assembled onto the bolt 30 after the bolt has passed through the rung 16, and then aligned with the longitudinal direction of the strut so that it fits easily between the rolled edges. Thereafter, rotating bolt 30 in a clockwise direction will cause the nut plate 32 to rotate until its ends 36 contact interior surfaces of the sides 24, where it will come to rest. Thereafter, further rotation of bolt 30 will cause the bolt to process through the nut plate 32, thereby tightening the rung 16 against the strut 12.

Preferably, the rung 16 is standard bar-stock configured, as by bending, into a U-shape having an elongate bight section 38 and distal arms 40. Holes 42 are provided in the rung 16 for connection to the strut 12 with the fastener 18. The rung 16 may be provided with flats 44 in the bar stock where the rung contacts a portion of the rolled edges 26. The flats 44 assist in preventing the rung from rotating about its axis.

The arms 40 are orthogonal to the bights 38 as shown; however, it is envisioned that alternative angles of connection may be desirable in particular circumstances. Further, the rung 16 may be provided with end caps 46, which would serve the dual purposes of covering sharp edges or burrs at the cut ends of the rungs and further may be provided with color coding to assist assemblers in easily identifying various rung sizes. In addition to bar-stock having a circular cross-section, other cross-sectional shapes are also envisioned, such as box-shaped, I-beam-shaped, open channel, or other configurations that provide structural rigidity and permit the rung to be configured as necessary.

Figure 3:
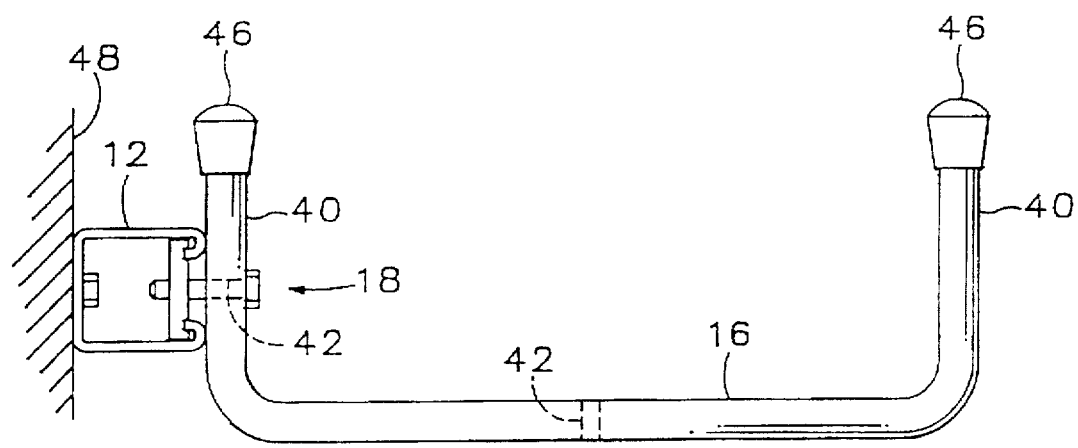
FIG. 3 is an alternative preferred embodiment for installing the cable tray of FIG. 1 on a vertical wall.

An alternative installation embodiment of the present invention is shown in FIG. 3 wherein a rung 16 is shown mounted to a strut 12 that is fastened to a vertical surface 48. In this embodiment, the rung 16 is attached to the strut through one of the rung arms 40.

Figure 4:
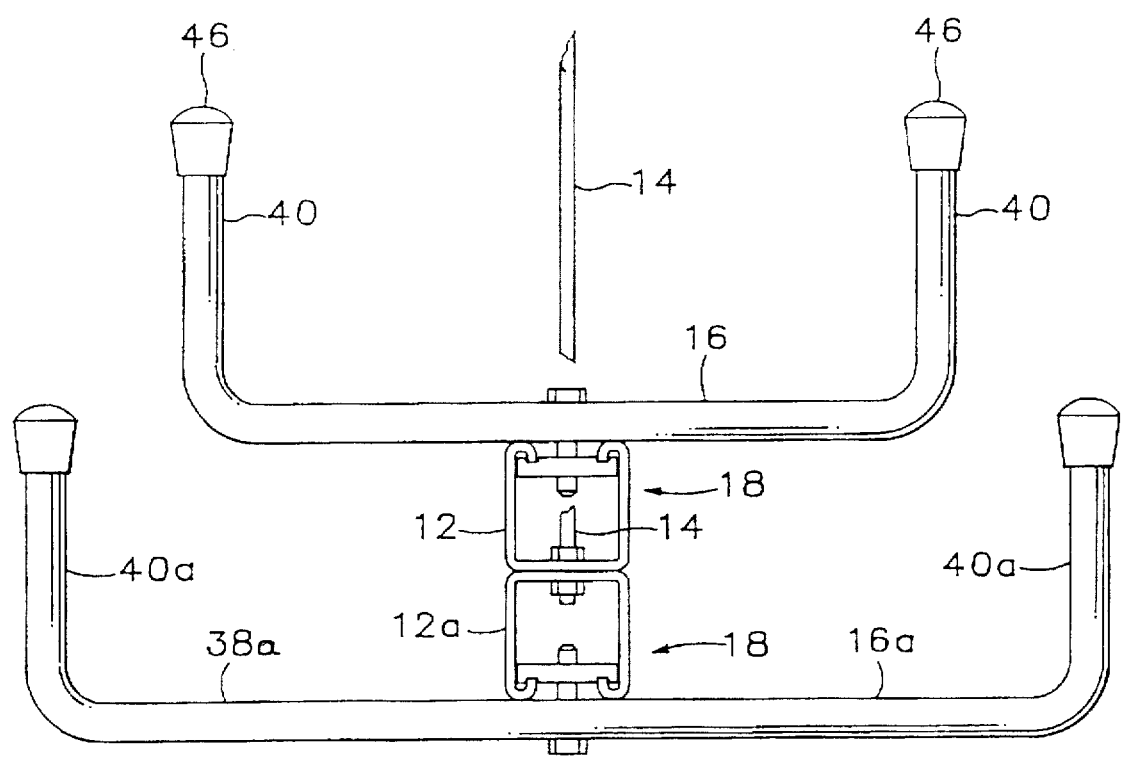
FIG. 4 is an alternative preferred embodiment for stacking cable trays of the present invention.

An alternative embodiment is shown in FIG. 4 wherein a pair of reversely oriented struts 12, 12a is connected to and suspended by the same threaded rod 14, and a series of rungs 16 is attached to respective struts to provide a two-tier cable tray. It should be specifically noted that bottom rungs 16a may be attached to bottom strut 12a such that the strut is located "upside-down" within a region defined by the arms 40a and bight 38a, such as depicted in the lower tray of the two-tier cable tray system shown in FIG. 4. Alternatively, a cable tray may be configured so that its strut 12 is located outside the region defined by the arms 40 and bight 38, as depicted in the upper tray of the two-tier tray system of FIG. 4. Both the upper and lower trays use the identical fasteners 18 to connect their rungs 16 to their struts 12, 12a. Note, however, that rungs 16a of the lower tray are longer than the rungs 16 of the upper tray, and the rungs of the stacked trays are symmetrically arranged to provide access to the lower tray, although this may not be required in all applications.

Figure 5:
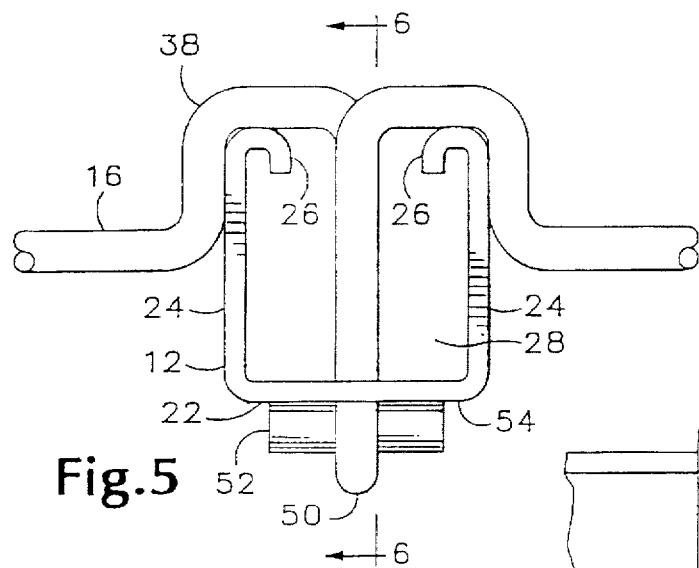
FIG. 5 is a partial end view of a cable tray of the present invention showing an alternative preferred embodiment of a rung and rung fastening system.
Figure 6:
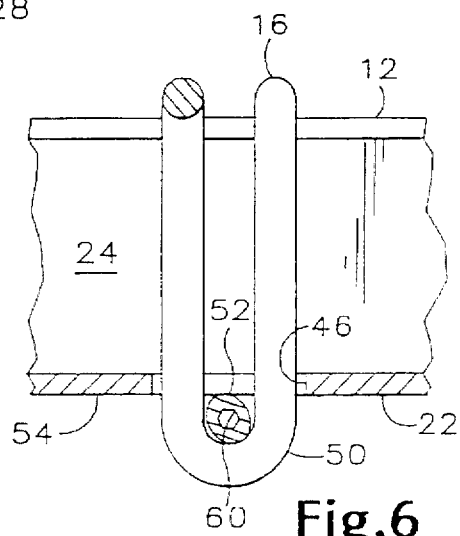
FIG. 6 is a partial longitudinal-sectional view of the cable tray of FIG. 5 taken along line 6—6 of FIG. 5.

With reference to FIGS. 5–8 there are shown alternative configurations of the fastener 18. In FIGS. 5 and 6 a portion of the bight 38 of rung 16 is provided with a loop oriented orthogonally to the elongate direction of the bight 38 so that the loop 50 can be received within the recess 28 of the strut 12 and inserted into a hole 46 in the strut web 22. A cam-shaped cylinder 52 is inserted into the loop 50 and thereafter rotated so that it jams against a lower surface 54 of the strut webb 22. As the cam-shaped cylinder 52 is jammed against the lower surface 54, top portions of the loop 50 are urged against the rolled edges 26, thereby fixing the rung 16 in position on the strut 12.

Figure 7:
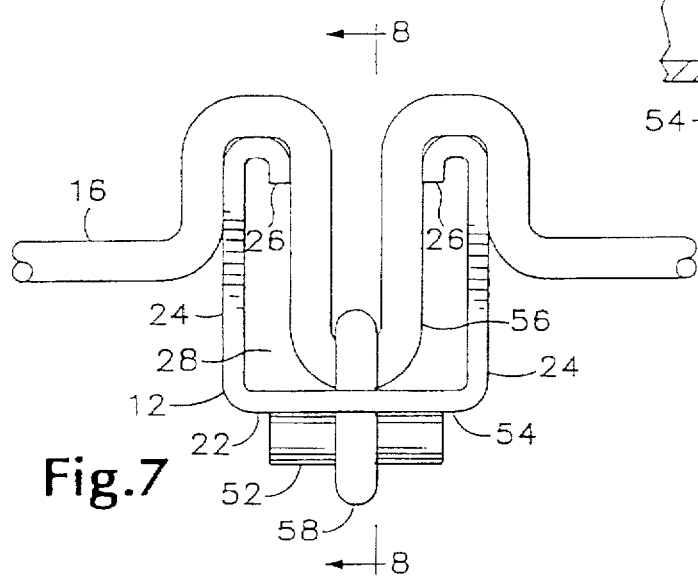
FIG. 7 is a partial end view of a cable tray of the present invention showing another alternative embodiment of rung and rung fastening system.
Figure 8:
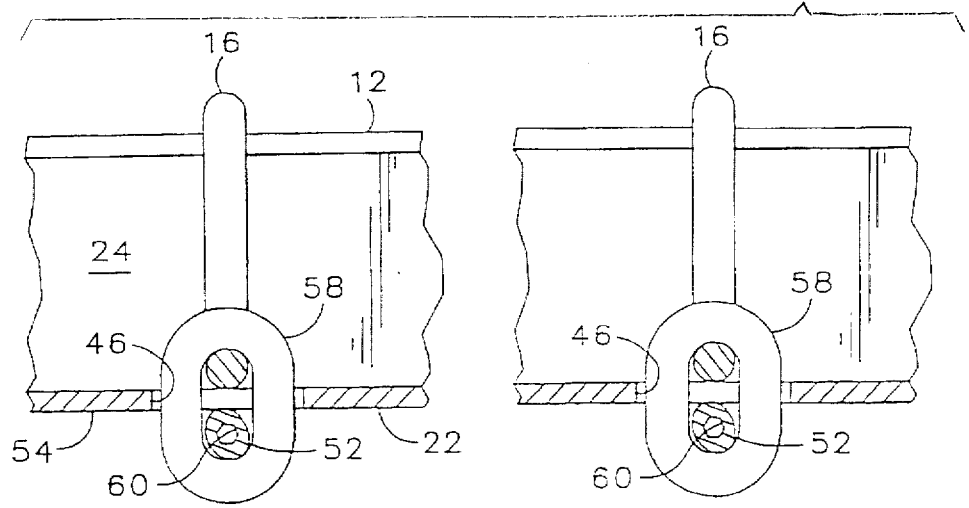
FIG. 8 is a partial longitudinal-sectional view of the cable tray system of FIG. 7 taken along line 8—8 of FIG. 7.

A further alternative configuration is shown in FIGS. 7 and 8 wherein the rung 16 includes a depending loop 56 and a link 58 that rests at the bottom of loop 56. The rung is positioned within the recess 28 of strut 12 so that the link 58 is located within hole 46. Thereafter, a cam-shaped cylinder 52 can be inserted into the loop beneath the web 22. As above, rotation of the cam-shaped cylinder 52 presses against the lower surface 54 of the web 22, thereby pulling the rung 16 tight against the rolled edges 26 to fix the rung in position against the strut 12.

In order to facilitate forcible rotation, the cam-shaped cylinder 52 is provided with a hex-shaped aperture 60 for receiving a hex wrench. The aperture 60 may take the form of other shapes which may then require custom-configured wrenches.

In the embodiments of FIGS. 5–8, it is not necessary that the rung 16 spans the channel 28. It is envisioned that one end of the rung could terminate within the channel.

The preferred method of installing the cable tray 10 comprises installing the struts 12 and thereafter attaching the rungs 16 with fasteners 18 such that the rungs transversely span channel 28. In one preferred embodiment the cable tray is suspended from an overhead surface, such as a ceiling structure, by means of the threaded rods 14. The strut 12 may be attached to the rods 14 so that the recess 28 is oriented upward or downward. The ends of the struts may be connected together by means of standard commercially available connectors, or the struts may be unconnected. Likewise, "T" junctions may be formed by abutting struts orthogonally to one another. The orthogonally arranged struts may be connected by commercially available connectors or disconnected. Two-tier trays may be formed by connecting the trays as exemplified in FIG. 4 or alternatively, the lower tray could be suspended from the upper tray by a threaded rod. Additionally, the rungs 16 may be connected to the struts 12 orthogonally or at an angle.

Numerous characteristics and advantages of the invention have been set forth in the foregoing description, together with details of the structure and function of the invention. The novel features of the invention are pointed out in the appended claims. The disclosure is illustrative only, and changes may be made in detail, especially in matters of shape, size, and arrangement of parts within the principle of the invention to the full extent indicated by the broad general meaning of the terms in the claims.

I claim:

1. A method of installing a cable tray, comprising the steps:
   (a) attaching an elongate strut having an elongate open recess to a building;
   (b) positioning an elongate rung transversely across the recess;
   (c) attaching the rung to the strut with a mechanical fastener after attaching the strut to the building; and
   (d) installing cable onto the rungs and substantially parallel to the strut.

2. The method of claim 1 wherein the step of attaching the strut to the building includes attaching a threaded rod to the building and attaching the strut to the threaded rod.

3. The method of claim 2 wherein the strut is suspended from a ceiling by the threaded rod.

4. The method of claim 1 further comprising the step of attaching the fastener to the rung before the rung is positioned transversely across the recess.

5. The method of claim 1 wherein the strut is attached to a vertical surface.

6. The method of claim 1 wherein the strut defines an aperture and the positioning step includes positioning a portion of the rung through the aperture.

7. The method of claim 1 wherein the fastener includes a nut-plate that is received in the recess such that it transversely spans the recess.

8. The method of claim 1 further comprising the steps of attaching a second strut to the strut of claim 1 and positioning a second rung against the second strut and attaching the second rung to the second strut with a second mechanical fastener.

9. A method of installing a cable tray in a building, comprising the steps:
   (a) attaching a plurality of rods to the building;
   (b) attaching a plurality of struts to the rods wherein each strut includes surfaces that define an elongate open recess;
   (c) attaching a plurality of rungs to the plurality of struts after the struts have been attached to the rods; and
   (d) installing cable onto the plurality of rungs and substantially parallel to the plurality of struts.

10. The method of claim 9 further comprising the step of abutting together ends of the struts to form a continuous length of the plurality of struts having a continuous length of the recesses therein.

11. The method of claim 9 wherein the struts define a plurality of apertures and the step of attaching the struts to the rods includes inserting ends of the rods into some of the apertures and installing a fastener onto the rods.

12. The method of claim 9 wherein the step of attaching the rungs to the struts includes attaching a mechanical fastener to each rung and to the struts.

13. The method of claim 12 wherein the mechanical fastener comprises a bolt and a nut-plate adapted to be received in the recess and to impinge upon the surfaces that define the recess so as to prevent rotation of the nut-plate when the bolt is rotated.

14. The method of claim 9 further including the steps of attaching a second plurality of struts to the plurality of struts of claim 9 such that the struts of claim 9 and the second plurality of struts are substantially parallel, and attaching a second plurality of rungs to the second plurality of struts thereby forming a second cable tray.

15. The method of claim 14 wherein the second plurality of struts are attached to the struts of claim 9 before the rungs of claim 9 are attached to the struts of claim 9.

16. The method of claim 14 wherein the second plurality of struts is attached to the struts of claim 9 after the rungs of claim 9 are attached to the struts of claim 9.

17. The method of claim 9 wherein the rungs further include distal arms connected to the bight portions thereby forming a region between the bight and the arms wherein the rungs are attached to the struts such that the struts are outside the region.

18. The method of claim 9 wherein the rungs further include distal arms connected to the bight portions thereby and forming a region between the bight and arms wherein the rungs are attached to the struts such that the struts are inside the region.

19. A method of installing a cable tray in a building, comprising the steps:
   (a) attaching a plurality of struts to a planer surface wherein each strut includes surfaces that define an elongate recess; and
   (b) attaching an arm of a plurality of rungs to the plurality of struts after the struts have been attached to the planer surfaces by attaching a mechanical fastener to each rung and to the struts.

20. The method of claim 19 wherein the mechanical fastener comprises a bolt and a nut-plate adapted to be received, within the recess and to impinge upon the surfaces that define the recess so as to prevent rotation of the nut-plate when the bolt is rotated.

21. A method of making a cable tray comprising:
   (a) removably attaching a series of bar-like rungs to a length of standard commercially-available channel having rolled edges at an elongate channel opening using removable mechanical fasteners to secure the rungs to the channel such that the rungs extend at least partially across the channel opening thereby defining a cable path that is substantially parallel to the channel.

22. The method of claim 21 further including the step of attaching the mechanical fasteners to the rungs before attaching the rungs to the channel.

23. A cable tray for holding a plurality of cables, comprising:
   (a) an elongate channel-shaped, commercially-available strut defining an elongate recess bounded by interior walls;
   (b) a rung having an attachment portion arranged transversely and spanning the elongate recess; and
   (c) a mechanical fastener for connecting the rung to the strut.

24. The cable tray of claim 23 wherein the strut includes opposing rolled edges and the mechanical fastener is adapted to be received in the recess and engage the rolled edges.

25. The cable tray of claim 23 wherein the rung includes a loop and the mechanical fastener is a cam that can be received within the loop and jammed against a portion of the strut.

26. The cable tray of claim 23 wherein the rung is U-shaped in profile having a bight and distal arms thereby forming a region between the bight and arms and the rung is attached to the strut such that the strut resides within the region.

27. The cable tray of claim 23 wherein the rung is U-shaped in profile having a bight and distal arms thereby forming a region between the bight and arms and the rung is attached to the strut such that the strut resides outside the region.

28. The cable tray of claim 23 wherein the fastener comprises a bolt and a nut-plate that is received within the recess and impinges against the interior walls that bound the recess such that rotation of the bolt does not rotate the nut-plate.

29. The cable tray of claim 23 further comprising a second strut that is fixedly connected to the strut of claim 21 and a second rung and second mechanical fastener for attaching the second rung to the second strut thereby forming a double cable tray.

30. A cable tray for holding a plurality of cables, comprising:

(a) a strut defining an elongate open recess and further defining a plurality of apertures;

(b) a rung having a U-shaped elevation including an elongate bight and distal arm portions; and (c) a mechanical fastener adapted to fixedly connect the rung to the strut such that the bight transversely spans the recess.

31. The cable tray of claim 30 wherein the fastener is an elongate shaft having an eccentric cross-section.

32. The cable tray of claim 31 wherein the fastener is located between a portion of the bight and an outside surface of the strut.

33. The cable tray of claim 31 wherein the fastener further includes an axially located recess for receiving a tool for rotating the fastener.

34. The cable tray of claim 30 wherein the bight includes a loop and the rung further comprises an annular ring that rests in the loop and is received through the aperture and wherein the fastener is located within the ring and impinges upon a surface of the strut.

35. The cable tray of claim 30 wherein the mechanical fastener comprises a bolt and a nut plate wherein the nut plate is received within the recess.

36. A method of installing a cable tray in a building, comprising the steps:

(a) attaching a plurality of rods to the building;

(b) attaching a plurality of struts to the rods wherein each strut defines a plurality of apertures and includes surfaces that define an elongate recess; and (c) attaching a plurality of rungs having a bight portion including a loop to the plurality of struts after the struts have been attached to the rods by inserting the loops through the apertures.

37. The method of claim 36 wherein the step of attaching the rungs to the struts further includes inserting a cam into the loops of the rungs after the loops have been inserted through the apertures.

38. A cable tray for holding a plurality of cables, comprising:

(a) a strut defining an elongate recess and further defining a plurality of apertures;

(b) a U-shaped rung including an elongate bight and distal arm portions, wherein the bight includes a loop that is received in one aperture of the strut; and (c) a mechanical fastener located within the loop such that it impinges on the strut to fixedly connect the rung to the strut such that the bight transversely spans the recess.

39. The cable tray of claim 38 wherein the fastener has an eccentric cross-section and is compressively loaded between the loop and the strut surface.

40. A method of installing a cable tray, comprising the steps:

(a) attaching an elongate strut having an elongate open recess to a building;

(b) positioning an elongate rung transversely across the recess and positioning a portion of the rung into the recess;

(c) attaching the rung to the strut with a mechanical fastener after attaching the strut to the building; and (d) installing cable onto the rungs and substantially parallel to the strut.

\* \* \* \* \*